United States Patent Office 3,634,349
Patented Jan. 11, 1972

3,634,349
METHOD OF ADDING A POLYVINYL-ALCOHOL SHOCK-INHIBITOR TO A PAPER COATING COLOR COMPOSITION
Mitsuhiro Goi, Osaka, Satoru Kageyama, Hyogo-ken, and Nobuo Mizuno, Osaka-fu, Japan, assignors to Nippon Gosei Kagaku Kogyo Kabushiki Kaisha, Higashi-ku, Osaka, Japan
No Drawing. Continuation-in-part of application Ser. No. 475,272, July 27, 1965. This application July 3, 1969, Ser. No. 839,093
Int. Cl. B32b 23/14; D21h 1/32
U.S. Cl. 260—17
9 Claims

ABSTRACT OF THE DISCLOSURE

A method for preparing a pigmented coating composition for paper, which comprises first adding a shock-inhibitor consisting of polyvinyl alcohol having acetyl groups of 8 to 13% by mole and a degree of polymerization of about 100 to about 500 into a previously prepared aqueous suspension of pigments and then adding a pigment-binder consisting of polyvinyl alcohol having acetyl groups of 3 to 7% by mole and a degree of polymerization of about 700 to about 1,300 into the suspension.

---

This application is a continuation-in-part of our now abandoned application Ser. No. 475,272, filed July 27, 1965.

The present invention relates to a method for preparing a pigmented coating composition for paper, and particularly relates to an improved method for preparing a pigmented coating composition containing polyvinyl alcohol as pigment-binder.

Though natural resins such as casein, protein and starch have been widely used as pigment-binder for pigment coating in the paper industry, the use of such natural resins may be accompanied with some disadvantages because of their fluctuating quality and their tendency to rot during storage.

In order to dissolve such troubles as caused by the use of natural resins, the use of polyvinyl alcohol, a kind of water-soluble synthetic resins, has been suggested for the purpose of pigment coating. Polyvinyl alcohol is usually produced by converting completely or partially acetyl groups of polyvinyl acetate into hydroxyl groups by means of hydrolysis or alcoholysis. Though there may be various grades of polyvinyl alcohol according to a degree of polymerization and the content of residual acetyl groups, most grades of polyvinyl alcohol under now commercial production in the world may be roughly divided into two groups. One of which is so-called completely hydrolyzed grade having the residual acetyl groups of about 1 to 2% by mole or less and another one is so-called partially hydrolyzed grade having the residual acetyl groups of about 10 to 12% by mole. The partially hydrolyzed grade of polyvinyl alcohol is not preferred for the application field of pigment coating for paper in many cases, because its too water-sensitive and too poor bonding properties cause discoloring or peeling of coating film in case of touching with wet hands or offset printing. On the other hand, the use of the completely hydrolyzed grade of polyvinyl alcohol may give a coating having good moisture or water-resistance. However, it tends to cause an undesired gelation or coagulation of an aqueous suspension of pigments and, consequently, it may give rough and non-glossy coatings. Particularly, it may be the most important obstacle in using the completely hydrolyzed grade of polyvinyl alcohol for pigment coating that a coagulation of a coating composition, commonly called "shock," is often caused immediately after polyvinyl alcohol is added to a pigment-suspension.

It is an object of the present invention to provide an improved method for preparing a pigmented coating composition without any trouble.

A particular object of the present invention is to provide a method for preparing a pigmented coating composition containing polyvinyl alcohol as pigment-binder without any gelation or coagulation of the composition.

Other objects of the present invention will be apparent from the following description and claims.

It has now been found that the above objects may be attained in accordance with the present invention by employing the two special grades of polyvinyl alcohol as a pigment-binder and a shock-inhibitor, respectively. The grade of polyvinyl alcohol employed as a pigment-binder in the present invention has residual acetyl groups of 3 to 7% by mole and a degree of polymerization of about 700 to about 1,300. Such degree of polymerization as described herein means average degree of polymerization calculated from the intrinsic viscosity of polyvinyl alcohol. Said special grade of polyvinyl alcohol may be as excellent as the completely hydrolyzed grade in its bonding properties and moisture-resistance and, furthermore, the use of the said special grade may give a low viscous and much more stable pigmented coating composition than those as prepared by using the completely hydrolyzed grade. However, it is difficult to prevent completely "shock" in preparing a coating composition even in case said special grade is used as pigment-binder and the use of the shock-inhibitor may be necessary. The shock-inhibitor as used in the present invention is a special grade of polyvinyl alcohol but different from such grade as used for the purpose of pigment-binder. It has residual acetyl groups of 8 to 13% by mole and a degree of polymerization of about 100 to about 500, preferably 100 to 250.

In preparing a pigmented coating composition according to the present invention, the shock-inhibitor as defined above is first added into a previously prepared aqueous suspension of pigments and then the pigment-binder as defined above is added into the suspension, if necessary, with some modifiers as noted below. The pigment-suspension may be prepared by dispersing pigments into an aqueous solution containing a dispersing agent such as sodium pyrophosphate.

The shock-inhibitor and pigment-binder may be preferably used in the ratio of 0.3 to 1.0% by dry weight of the former and 9 to 15% by dry weight of the latter to the dry weight of pigments. The solid content in the composition is preferably about 60% by weight or less to the total weight of the composition.

Examples of pigments employed preferably in the present invention are clay, mica, talc, alumina, calcium carbonate, titanium dioxide, barium sulfate, satin white, etc.

It is desired in many cases to use an aqueous dispersion of a water-insoluble thermoplastic resin for modifying polyvinyl alcohol used as pigment-binder. By the use of such dispersion, the moisture-resistance and printability of a coating film may be further improved, and it makes possible to obtain more glossy and clearer print on the surface of a coated paper. The thermoplastic resin may be preferably polymers or copolymers of monomers selected from the group consisting of butadiene, styrene, acrylonitrile, $C_1$ to $C_4$-alkyl acrylates, $C_1$ to $C_4$-alkyl methacrylates and vinyl esters. Examples of said copolymers are copolymers of styrene-butadiene, acrylonitrile-butadiene, styrene-acrylonitrile-butadiene, butyl acrylate-butadiene, methyl methacrylate-butadiene, butyl acrylate-vinyl acetate, butyl acrylate-methyl methacrylate, etc. The use of copolymers of one or more of said monomers with a minor amount of acrylic or methacrylic acid, alkali or ammonium salts, amides, or N-hydroxymethylated amides thereof may be also preferred. In case of the use of said dispersions, it is preferred that the employed amounts of polyvinyl alcohol used as pigment-binder and the dispersion are selected from the range of 4 to 8 parts by weight of polyvinyl alcohol, 1 to 11 parts by net weight of a resin contained in the dispersion and 9 to 15 parts by total weight of both per 100 parts by weight of pigments.

If an extremely high water-resistance of a coating film is desired, a known insolubilizer for polyvinyl alcohol may be used. Examples of such insolubilizers as used for this purpose are N-hydroxymethylated amino compounds such as dimethylol urea, N-methylol melamine, N-methylol acetoguanamine and N-methylol benzoguanamine, ethers thereof such as methylated N-methylol melamine, and copolymers of N-methylol acrylamide; the use of N-methylol melamine being preferred. The employed amount of such insolubilizers is preferably about 5 to about 15% by weight to the weight of polyvinyl alcohol. The undesired formation of too hard and breakable films of polyvinyl alcohol to be caused by the use of said insolubilizers may be prevented by the co-use of polyvinyl alcohol and such aqueous dispersion as described above.

The use of a water-soluble resin selected from the group consisting of carboxymethyl cellulose, carboxymethyl starch and the salts thereof may be effective to improve further the coatability of the composition. The water-soluble resins having a degree of etherification of more than about 0.7 and viscosity of a 2% aqueous solution at 25° C., of less than about 200 centipoises are especially suitable for this purpose. The employed amount of said water-soluble resin is preferably about 0.3 to 1.3% by weight to the total net weight of solids in the composition. If it is especially desired to improve the coatability without any increase in viscosity of the composition, it is suggested to use a small amount of an alcohol such as methanol or ethanol or a surfactant together with the water-soluble resins for controlling viscosity of the composition.

According to the present invention, any trouble caused in preparing a pigmented coating composition for paper by using polyvinyl alcohol as pigment-binder may be eliminated, and the composition which may give coated papers having the improved properties such as increased moisture or water-resistance, high pick-resistance, smooth and glossy appearance, excellent printability, etc. may be obtained.

The present invention is illustrated in detail by the following example. However, the example serves only to explain but not to limit the invention in any means. Parts and percentages specified are by weight unless otherwise indicated.

EXAMPLE

Into a sigma blade mixer containing a pigment-suspension consisting of 3,000 parts of clay, 12 parts of sodium phosphate and 3,600 parts of water, 60 parts of a 30% aqueous solution of polyvinyl alcohol having acetyl groups of 12% by mole and a degree of polymerization of about 200 was added as shock-inhibitor and then 1,710 parts of 14% aqueous solution of polyvinyl alcohol having acetyl groups of 4% by mole and a degree of polymerization of about 1,300 and 375 parts of a 48% aqueous dispersion of styrene-butadiene copolymer (molar ratio: 6:4) were added with agitation. No coagulation or gelation occurred, and a stable composition having concentration of 40% and viscosity of 150 centipoises at 25° C. was obtained.

Thus prepared composition was applied to the surface of paper by means of a trailing blade coater until the coat weight became to 13.6 g./m.². The very smooth and pattern-free surface was obtained.

In control prepared in the same manner as described above except that the shock-inhibitor was not used, it was observed that the obtained composition became remarkably viscous immediately after the addition of polyvinyl alcohol to the pigment-suspension and a rough and not glossy surface was obtained by coating a paper with thus prepared composition.

In another control prepared in the same manner as described above except that polyvinyl alcohol having acetyl groups of 1% by mole and a degree of polymerization of about 1,300 was used as pigment-binder without using the shock-inhibitor, a coagulation of the composition occurred at the addition of polyvinyl alcohol to the pigment-suspension and it was impossible to prepare any stable composition.

What is claimed is:

1. A method for preparing a pigmented coating composition whereby polyvinyl alcohol addition-shock is avoided, said method comprising first adding a first polyvinyl alcohol to a previously prepared aqueous suspension of pigments, and thereafter adding a binder composition consisting essentially of substantially a second polyvinyl alcohol, said first polyvinyl alcohol having acetyl groups of about 8% to about 13% and a degree of polymerization of about 100 to about 500, said second polyvinyl alcohol having acetyl groups of about 3% to about 7% by mole and a degree of polymerization of about 700 to about 1300.

2. A method according to claim 1, in which said first polyvinyl alcohol and said second polyvinyl alcohol are used in a ratio of about 0.3% to about 1.0% by dry weight of said first polyvinyl alcohol and about 9% to about 15% by dry weight of said second polyvinyl alcohol, to the dry weight of said pigments.

3. A method according to claim 1, in which said binder composition includes a minor amount of an aqueous dispersion of water-insoluble thermoplastic first resin selected from the group consisting of polymers and copolymers of monomers selected from the group consisting of butadiene, styrene, acrylonitrile, $C_1$ to $C_4$-alkyl acrylates, $C_1$ to $C_4$-alkyl methacrylates, and vinyl esters.

4. A method according to claim 3, in which said binder composition is employed in an amount including said second polyvinyl alcohol ranging from about 4% to about 8% by dry weight in ratio to said first resin which is employed in an amount ranging from about 1% to about 11% by dry weight, said second polyvinyl alcohol and said first resin considered together ranging from about 9% to about 15% by their combined total dry weight, based on dry weight of said pigments.

5. A method according to claim 1, including adding an insolubilizer for polyvinyl alcohol subsequent to said first adding, said insolubilizer being selected from the group consisting of N-hydroxymethylated amino compounds and ethers thereof.

6. A method according to claim 1, including adding a water-soluble second resin subsequent to said first adding, said second resin being selected from the group consisting of carboxymethyl cellulose, carboxymethyl starch and salts thereof, having a degree of esterification of more than about 0.7 and viscosity of a 2% solution at 25° D., of less than about 200 centipoises.

7. A method according to claim 6, in which said second resin is employed at from about 0.3% to about 1.3% by solids net weight of said coating composition.

8. A method according to claim 1, in which said binder composition includes a first resin employed in an amount ranging from about 1% to about 11% by dry weight in ratio to said second polyvinyl alcohol which is employed in an amount ranging from about 4% to about 8% by dry weight and in ratio to said first polyvinyl alcohol employed in an amount ranging from about 0.3% to about 1.0% by dry weight, and considered together said first and second polyvinyl alcohol and said first resin ranging from about 9% to about 15% by their combined total dry weights, based on dry weight of said pigments, said first resin being selected from the group consisting of styrene-butadiene, acrylonitrile-butadiene, styreneacrylonitrile-butadiene, butyl acrylate-butadiene, methyl methacrylate-butadiene, butyl acrylate-vinyl acetate, and butyl acrylate-methyl methacrylate, and in which said method further includes, subsequent to said first adding, adding a water-soluble second resin and adding an insolubilizer for polyvinyl alcohol, said second resin being selected from the group consisting of carboxymethyl cellulose, carboxymethyl starch and salts thereof, having a degree of esterification of more than about 0.7 and viscosity of a 2% solution at 25° D., of less than about 200 centipoises, and said insolubilizer being selected from the group consisting of dimethylol urea, N-methylol melamine, N-methylol acetoguanamine, N-methylol benzoguanamine, methylated N-methylol melamine and copolymer of N-methylol acrylamide.

9. A method according to claim 8, in which said second resin is employed at from about 0.3% to about 1.3% by solids net weight of said coating composition.

References Cited
UNITED STATES PATENTS

| | | |
|---|---|---|
| 2,771,456 | 11/1956 | Konigsberg et al. 260—29.6 WA |
| 3,298,987 | 1/1967 | Colgan et al. 260—29.6 WA |
| 3,404,112 | 10/1968 | Lindemann et al. 260—29.6 WA |

WILLIAM H. SHORT, Primary Examiner

L. M. PHYNES, Assistant Examiner

U.S. Cl. X.R.

260—17.4 ST, 29.6 B, 29.6 WA